United States Patent
Huang et al.

(10) Patent No.: US 11,906,093 B2
(45) Date of Patent: Feb. 20, 2024

(54) MOUNTING STRUCTURE, LOWER WATER OUTLET TANK, AND AIR TREATMENT DEVICE

(71) Applicant: Gree Electric Appliances, Inc. of Zhuhai, Zhuhai (CN)

(72) Inventors: Zhongping Huang, Zhuhai (CN); Jianfei Hou, Zhuhai (CN); Jinbao Zhou, Zhuhai (CN); Hai Yang, Zhuhai (CN); Xianle Mo, Zhuhai (CN); Ruyi Ma, Zhuhai (CN); Tuchun Sun, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 465 days.

(21) Appl. No.: 17/048,884

(22) PCT Filed: Dec. 25, 2018

(86) PCT No.: PCT/CN2018/123275
§ 371 (c)(1),
(2) Date: Oct. 19, 2020

(87) PCT Pub. No.: WO2020/042483
PCT Pub. Date: Mar. 5, 2020

(65) Prior Publication Data
US 2021/0172554 A1  Jun. 10, 2021

(30) Foreign Application Priority Data
Aug. 27, 2018  (CN) .......................... 201810978863.4

(51) Int. Cl.
*F16L 37/252* (2006.01)
*F16L 37/38* (2006.01)

(52) U.S. Cl.
CPC ............. *F16L 37/252* (2013.01); *F16L 37/38* (2013.01)

(58) Field of Classification Search
CPC ... F16L 37/252; F16L 37/38; F24F 2006/008; F24F 6/12; F16K 27/00
See application file for complete search history.

(56) References Cited

U.S. PATENT DOCUMENTS 3,499,243 A  *  3/1970  Joseph ................... A01K 97/05
                                                        43/56
8,567,648 B2 * 10/2013  Nufer ..................... B65D 25/48
                                                        222/511
(Continued)

FOREIGN PATENT DOCUMENTS

CN        203953298 U      11/2014
CN        104433820         *  3/2015
(Continued)

OTHER PUBLICATIONS

International Search Report for corresponding application PCT/CN2018/123275 filed Dec. 25, 2018; dated Apr. 11, 2019.

*Primary Examiner* — Bob Zadeh
(74) *Attorney, Agent, or Firm* — CANTOR COLBURN LLP

(57) ABSTRACT

Some embodiments of the present disclosure provide a mounting structure, a lower water outlet tank, and an air treatment device. The mounting structure is used for mounting a water outlet valve (3) to a water tank body (2) of a lower water outlet tank. The mounting structure includes a rotating connection member (1) on which the water outlet valve (3) is disposed and which includes a rotating operation portion (11) and a first cooperation portion (12) connected with each other. The mounting structure further includes a second cooperation portion (21) disposed on the water tank body (2), the rotating operation portion (11) is rotated by a (Continued)

predetermined angle, such that the first cooperation portion (12) and the second cooperation portion (21) is converted between a first state of separation and a second state of mutual occlusion.

16 Claims, 3 Drawing Sheets

(56) References Cited

U.S. PATENT DOCUMENTS

| | | | | |
|---|---|---|---|---|
| 2005/0067022 | A1* | 3/2005 | Istre, Jr. | F16L 37/252 |
| | | | | 137/515.5 |
| 2007/0204843 | A1* | 9/2007 | Carrato | F16K 1/308 |
| | | | | 126/39 N |
| 2014/0183860 | A1* | 7/2014 | Stead | F16L 37/18 |
| | | | | 285/330 |
| 2015/0240977 | A1* | 8/2015 | Zonneveld | F16L 23/032 |
| | | | | 251/149.6 |
| 2021/0172554 | A1* | 6/2021 | Huang | F16L 37/252 |

FOREIGN PATENT DOCUMENTS

| | | | |
|---|---|---|---|
| CN | 104433820 A | | 3/2015 |
| CN | 205481512 U | | 8/2016 |
| CN | 205896296 U | | 1/2017 |
| CN | 106563199 | * | 4/2017 |
| CN | 106563199 A | | 4/2017 |
| CN | 207487047 U | | 6/2018 |
| CN | 207647766 U | | 7/2018 |
| CN | 109027361 A | | 12/2018 |
| GB | 691987 | | 5/1953 |
| JP | 08135898 A | | 5/1996 |
| JP | 2003161462 A | * | 6/2003 |
| JP | 200569210 A | | 3/2005 |
| JP | 2006306460 | * | 11/2006 |
| KR | 200448478 | * | 4/2010 |

* cited by examiner

MOUNTING STRUCTURE, LOWER WATER OUTLET TANK, AND AIR TREATMENT DEVICE

CROSS REFERENCE TO RELATED APPLICATIONS

The disclosure claims priority to Chinese Patent Application No. 201810978863.4, filed on Aug. 27, 2018, entitled "Mounting Structure, Lower Water Outlet Tank, and Air Treatment Device", the disclosure of which is hereby incorporated by reference in its entirety.

TECHNICAL FIELD

The disclosure relates to a technical field of water outlet valve mounting, and more particularly, to a mounting structure, a lower water outlet tank, and an air treatment device.

BACKGROUND

A mode of assembling a water tank nut known to inventors mostly relies on a threaded fit. In production, this mode needs to ensure that thread is tightened to ensure its effective fixation. In manufacturing, the water tank nut known to inventors needs to be threaded, which is difficult to manufacture. Therefore, production and manufacturing increase a cost of personnel and materials.

SUMMARY

Some embodiments of the present disclosure provide a mounting structure, a lower water outlet tank, and an air treatment device. The mounting structure mounts a water outlet valve on a water tank body by rotating and buckling, thereby avoiding a fixing manner of screw tightening, saving manufacturing and labor costs, and improving the mounting efficiency to a certain extent.

Some embodiments of the disclosure adopt the following technical solutions.

Some embodiments of the present disclosure provide a mounting structure used for mounting a water outlet valve to a water tank body of a lower water outlet tank. The mounting structure includes a rotating connection member on which the water outlet valve is disposed and which includes a rotating operation portion and a first engagement portion connected with each other. The mounting structure further includes a second cooperation portion disposed on the water tank body, the rotating operation portion being rotated by a predetermined angle, such that the first cooperation portion and the second cooperation portion is converted between a first state of separation and a second state of mutual occlusion.

In some embodiments, the rotating connection member includes a body, the first cooperation portion includes a clamping slot provided on the body and extending along a circumferential direction of the rotating connection member, the second cooperation portion includes a clamping protrusion that is inserted into the clamping slot, and the clamping protrusion extends from an outside to an inside in a radial direction of the rotating connection member; or, the first cooperation portion includes a clamping protrusion provided on the body extending along a circumferential direction of the rotating connection member, the clamping protrusion extends from an inside to an outside in a radial direction of the rotating connection member, and the second cooperation portion includes a clamping slot that can be cooperated with the clamping protrusion.

In some embodiments, the clamping slot is provided on the rotating connection member, the rotating connection member includes a cylindrical structure extending along an axial direction, an outer side wall of the cylindrical structure forms a slot bottom of the clamping slot, a first radial structure and a second radial structure extending along the radical direction of the rotating connection member are disposed on the cylindrical structure, the first radial structure is close to the operation portion, the second radial structure is away from the operation portion, the first radial structure includes a first plane facing the second radial structure, the second radial structure includes a second plane facing the first radial structure, and the first plane and the second plane form a slot side wall of the clamping slot.

In some embodiments, the first radial structure is in a shape of an annular plate, and the second radial structure includes a plurality of clamping pieces, and the plurality of clamping pieces are evenly arranged in a circumferential direction of the cylindrical structure; or the first radial structure is in a shape of an annular plate; or the second radial structure includes a plurality of clamping pieces, and the plurality of clamping pieces are evenly arranged in a circumferential direction of the cylindrical structure.

In some embodiments, the second cooperation portion includes a plurality of clamping protrusions arranged at intervals in a circumferential direction, a space between two adjacent clamping protrusions forms a notch portion, there is a one-to-one correspondence between the plurality of clamping protrusions and the plurality of clamping pieces, there is a one-to-one correspondence between a plurality of notch portions and the plurality of clamping pieces; in the first state, each of the plurality of clamping pieces is located at a corresponding notch portion in the circumferential direction, and in the second state, each of the plurality of clamping pieces rotates to a corresponding clamping protrusion.

In some embodiments, the mounting structure further includes a plurality of limiting ribs, the plurality of limiting ribs are provided on the plurality of clamping protrusions in one-to-one correspondence, each of the plurality of limiting ribs is used to limit a movement of a corresponding clamping piece relative to the corresponding clamping protrusion, and each of the plurality of limiting ribs extends from a side of the corresponding clamping protrusion close to the second plane to a direction away from the corresponding clamping protrusion.

In some embodiments, the mounting structure further includes a first limiting structure provided on the water tank and a second limiting structure provided on the rotating connection member, and a rotation direction of the first cooperation portion relative to the second cooperation portion is limited by the cooperation of the first limiting structure and the second limiting structure.

In some embodiments, the rotating operation portion includes an operation handle portion disposed on the body, the body includes an annular main body, and the operation handle portion extends from a radial outer edge of the annular main body to a radial outer side of the annular main body.

In some embodiments, the mounting structure includes a sealing structure, located between the first plane and the clamping protrusion in an assembly state.

On the other hand, the disclosure adopts the following technical solutions.

Some embodiments of the present disclosure provide a lower water outlet tank, which includes a water tank body and a water outlet valve. The water outlet valve is mounted on the water tank body by the above mounting structure.

In some embodiments, the disclosure adopts the following technical solutions.

Some embodiments of the present disclosure provide an air treatment device, which includes the above lower water outlet tank.

The disclosure provides a mounting structure, a lower water outlet tank, and an air treatment device. The mounting structure mounts a water outlet valve on a water tank body by rotating a rotating operation portion at a predetermined angle, thereby avoiding influence on mounting of the water outlet valve due to undetermined rotation angle range and different rotation angle ranges of different operators during a fixing manner of screw tightening, saving manufacturing and labor costs, and improving a mounting efficiency to a certain extent.

BRIEF DESCRIPTION OF THE DRAWINGS

In order to more clearly illustrate the embodiments of the disclosure or the technical solutions in the art known to inventors, the drawings used in the description of the embodiments or the art known to inventors will be briefly described below. It is apparent that the drawings in the following description are only embodiments of the disclosure, and other drawings can be obtained from those skilled in the art according to the disclosed drawings without any creative work.

wherein 1, rotating connection member; 11, rotating operation portion; 111, operation handle portion; 12, first cooperation portion; 13, body; 131, clamping slot; 1311, first radial structure; 1312, second radial structure; 132, cylindrical structure; 14, second limiting structure; 2, water tank body; 21, second cooperation portion; 211, clamping protrusion; 2111, limiting rib; 212, notch portion; 22, first limiting structure; 3, water outlet valve.

DETAILED DESCRIPTION OF THE EMBODIMENTS

The following describes the disclosure based on the embodiments, but the disclosure is not limited to these embodiments. In the detailed description of the disclosure below, some specific details are described in detail. Those skilled in the art can fully understand the disclosure without the description of these details. In order to avoid confusing the essence of the disclosure, well-known methods, processes, flows, and elements have not been described in detail.

In addition, those of ordinary skill in the art should understand that the drawings provided herein are for illustrative purposes, and the drawings are not necessarily drawn to scale.

Unless context clearly requires, the words "including", "containing" and the like in the entire specification and claims should be interpreted as the meaning of inclusive rather than exclusive or exhaustive meaning, that is, "including but not limited to" meaning.

In the description of the disclosure, it should be understood that the terms "first", "second", etc. are for descriptive purposes only, and cannot be understood as indicating or implying relative importance. In addition, in the description of the disclosure, unless otherwise stated, the meaning of "multiple" is two or more.

Figure 1:
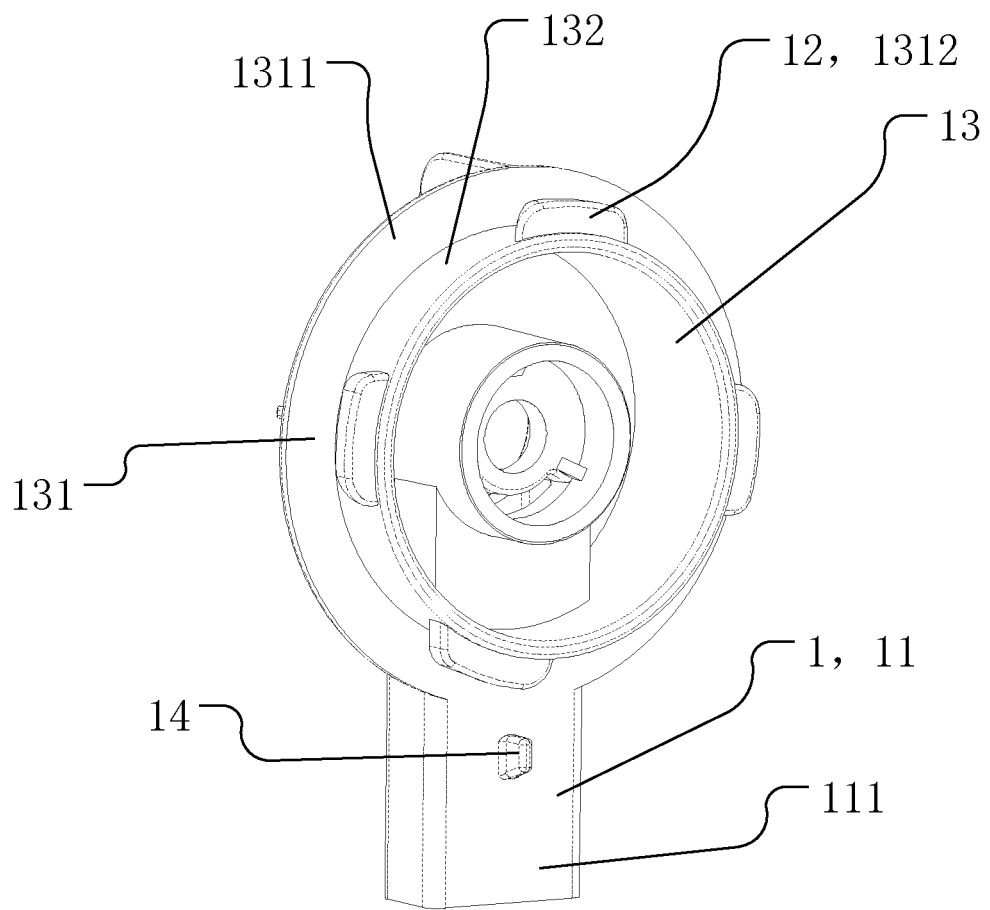
FIG. 1 illustrates a schematic structure diagram of a rotating connection member according to an embodiment of the disclosure.
Figure 2:
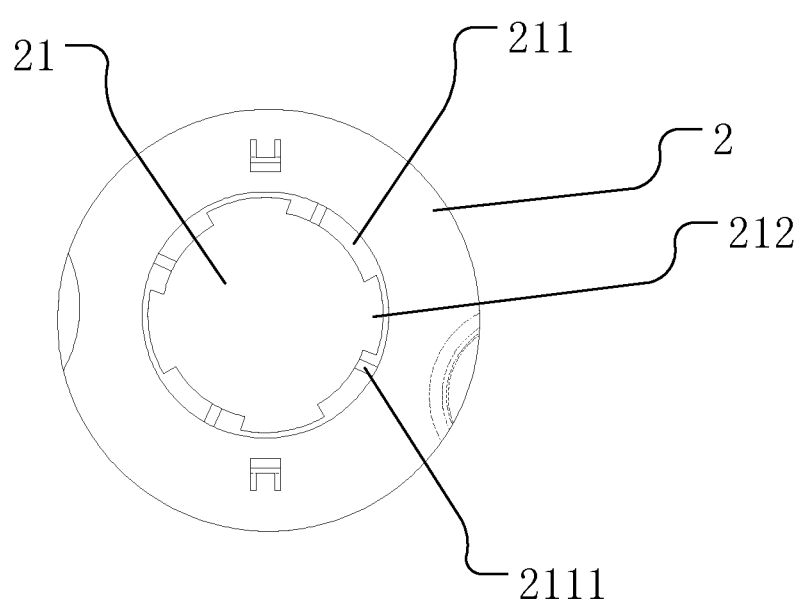
FIG. 2 illustrates a partial schematic structure diagram of a water tank body according to an embodiment of the disclosure.
Figure 3:
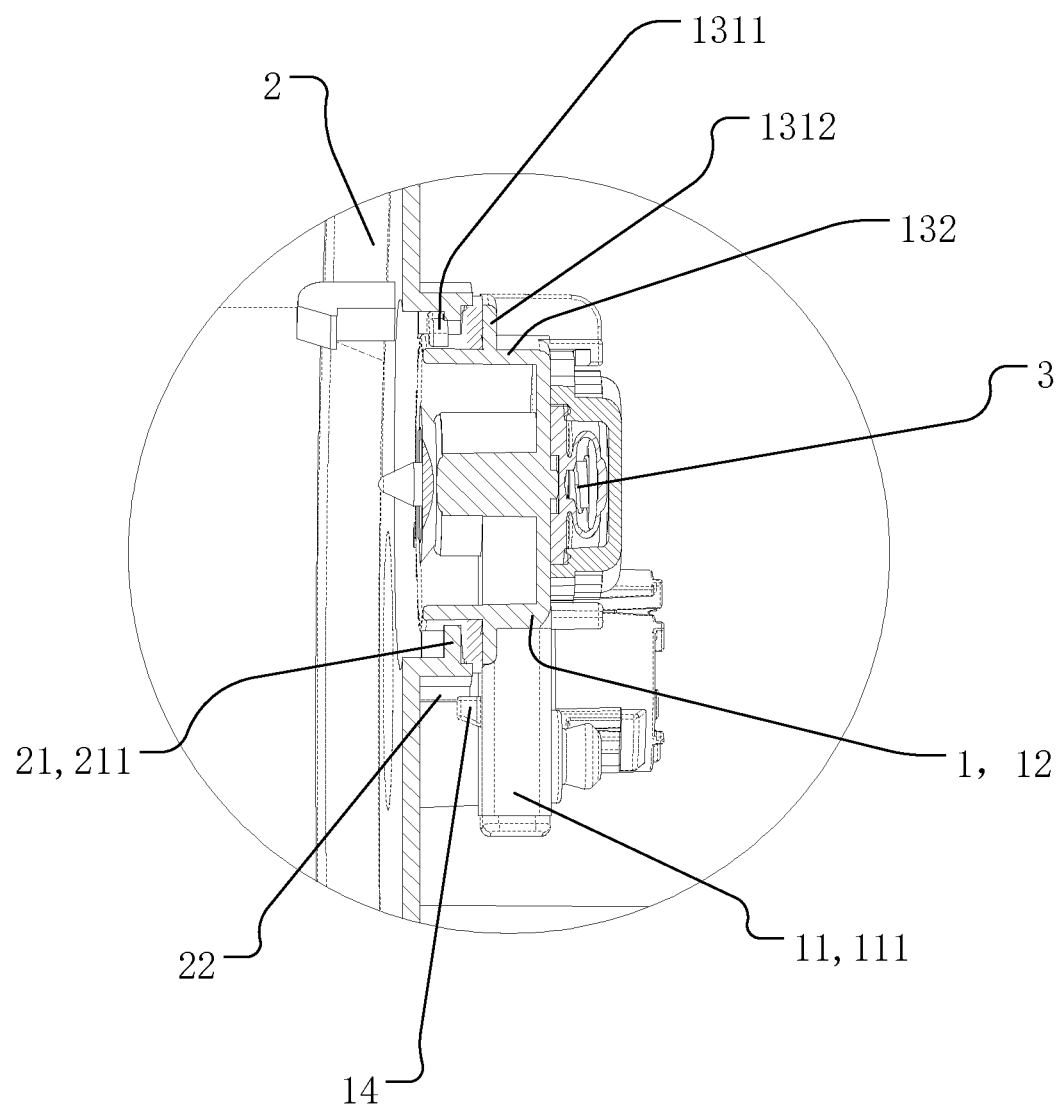
FIG. 3 illustrates a partial cross-sectional view of a lower water outlet tank and a water outlet valve in an assembly state according to an embodiment of the disclosure.

Referring to FIG. 1 to FIG. 3, an embodiment of the disclosure provides a mounting structure for mounting a water outlet valve 3 to a water tank body 2 of a lower water outlet tank, a lower water outlet tank provided with the mounting structure, and an air treatment device provided with the lower water outlet tank. In some embodiments, the air treatment device is an air humidifier. The mounting structure includes a rotating connection member 1. The water outlet valve 3 is disposed on the rotating connection member 1. The rotating connection member 1 includes a rotating operation portion 11 and a first cooperation portion 12 connected to each other. The mounting structure further includes a second cooperation portion 21 disposed on the water tank body 2. The rotating operation portion 11 is rotated by a predetermined angle, such that the first cooperation portion 12 and the second cooperation portion 21 can convert between a first state of separation and a second state of mutual occlusion. The mounting structure effectively avoids an increase in manufacturing cost caused by a manufacturing of threads in a threaded fixing mode through a rotating occlusion fixing mode, while improving a convenience of assembly, and effectively avoiding an increase in labor costs caused by tightening threads during a assembly process. Moreover, if a threaded connection is used, the operator will have different tightening degrees, which will cause difficulties in a subsequent disassembly of the water outlet valve 3, and will also affect an assembly of the water outlet valve 3, for example, affect a moving distance of a valve core of the water outlet valve 3. By means of the mounting structure of rotating occlusion, the above problem can be effectively avoided, and assembly efficiency and assembly reliability can be improved.

Referring to FIG. 1 to FIG. 2, in some embodiments, the rotating connection member 1 includes a body 13, the first cooperation portion 12 includes a clamping slot 131 provided on the body 13 and extending along a circumferential direction of the rotating connection member 1, the second cooperation portion 21 includes a clamping protrusion 211 that is inserted into the clamping slot 131, the clamping protrusion 211 extends from an outside to an inside in a radial direction of the rotating connection member 1, and a fixed connection between the first cooperation portion 12 and the second cooperation portion 21 is realized by the cooperation of the clamping protrusion 211 and the clamping slot 131, so as to ensure a fixed connection between the rotating connection member 1 and the water tank body 2 and ensure normal mounting of the water outlet valve 3. It is to be noted that alternatively, the first engaging portion 12 includes a clamping protrusion 211 provided on the body 13 along a circumferential direction of the rotating connection member 1, the clamping protrusion 211 extends from an inside to an outside in a radial direction of the rotating connection member 1, and the second cooperation portion 21 includes a clamping slot 131 that can be cooperated with the clamping protrusion 211, so that an fixed connection between the first cooperation portion 12 and the second cooperation portion 21 can also be realized.

Referring to FIG. 1 to FIG. 2, in some embodiments, the clamping slot 131 is provided on the rotating connection member 1, the rotating connection member 1 includes a cylindrical structure 132 extending along an axial direction, an outer side wall of the cylindrical structure 132 forms a slot bottom of the clamping slot 131, a first radial structure 1311 and a second radial structure 1312 extending along the radical direction of the rotating connection member 1 are disposed on the cylindrical structure 132, the first radial structure 1311 is close to the rotating operation portion 11, the second radial structure 1312 is away from the rotating operation portion 11, the first radial structure 1311 includes a first plane facing the second radial structure 1312, the second radial structure 1312 includes a second plane facing the first radial structure 1311, and the first plane and the second plane form a slot side wall of the clamping slot 131. In an assembly state, in an axial direction of the cylindrical structure 132, the clamping protrusion 211 is sandwiched between the first plane and the second plane, so as to prevent the rotating connection member 1 from falling off the water tank body 2. It is to be noted that the cylindrical structure 132 is mainly used to connect the first radial structure 1311 and the second radial structure 1312, to ensure that the first plane and the second plane are cooperated with each other to position and fix the clamping protrusion 211, so as to limit a movement of the clamping protrusion 211 in the axial direction of the cylindrical structure 132. An outer side wall of the cylindrical structure 132 (the outer side wall is a bottom of the above clamping slot 131) is continuous, or is an outer side wall of the cylindrical structure 132 formed by arranging a plurality of connection strips or connection plates at intervals in the circumferential direction of the cylindrical structure 132, as long as a stable connection of the first radial structure 1311 and the second radial structure 1312 and a stable overall structure of the rotating connection member 1 is ensured, and the outer side wall of the cylindrical structure 132 is set to a continuous overall structure to improve an overall structure strength of the rotating connection member 1. Moreover, the cylindrical structure 132 is a square tube, a circular tube, or other structural forms. In some embodiments, the cylindrical structure 132 is a circular tube, which has good structural strength and facilitates rotation occlusion of the rotating connection member 1 and the water tank body 2.

Referring to FIG. 1 to FIG. 2, in some embodiments, the first radial structure 1311 is in a shape of an annular plate, in some embodiments, the first radial structure 1311 is in a circular ring shape, to better cooperate with the circular cylindrical structure 132, and to improve an overall appearance and structural strength of the rotating connection member 1. In some embodiments, the second radial structure 1312 includes a plurality of clamping pieces, which are evenly arranged in the circumferential direction of the cylindrical structure 132. Meanwhile, the clamping protrusions 211 on the second cooperation portion 21 are arranged at intervals in a circumferential direction of the second cooperation portion, a space between two adjacent clamping protrusions 211 forms a notch portion 212, in a first state, the clamping piece is located at the notch portion 212 in the circumferential direction of the second cooperation portion, and in a second state, the clamping piece rotates to the clamping protrusion 211. In some embodiments, a number of notch portions 212, clamping pieces and clamping protrusions 211 are equal. When assembling, each clamping piece is placed at a position of the corresponding notch portion 212, the clamping piece extends to an axial inner side (an inner side in some embodiments of the disclosure refers to a side close to an interior of the water tank body 2) of the second cooperation portion 21 through the notch portion 212, and then the rotating operation portion 11 is rotated by a predetermined angle to drive the cylindrical structure 132 to rotate, thereby making the clamping piece moves along a circumferential of the cylindrical structure 132. The clamping piece is away from the notch portion 212 to move toward the clamping protrusion 211, so that the clamping protrusion 211 is between the first plane and the second plane to achieve occlusion connection. In order to ensure correct occlusion of the clamping piece and the clamping protrusion 211, a limiting rib 2111 is provided on the clamping protrusion 211 for limiting the movement of the clamping piece relative to the clamping protrusion 211, that is, limiting a size of a predetermined angle of a forward rotation (a forward direction in some embodiments of the disclosure refers to a direction of rotation during assembly) of the rotating operation portion 11. The limiting rib 2111 extends from a side of the clamping protrusion 211 close to the second plane in a direction away from the clamping protrusion 211. In a process of moving the clamping piece to abut against the limiting rib 2111 from the notch portion 212, a rotation angle of the rotating operation portion 11 is the predetermined angle. The limiting rib 2111 also limits a reverse movement of the clamping piece relative to the clamping protrusion 211, thereby limiting a reverse rotation of the rotating operation portion 11, reducing requirements for an operator, and effectively ensuring the occlusion connection between the rotating connection member 1 and the water tank body 2 at a predetermined angle during forward rotation. It is to be noted that the limiting rib 2111 is disposed on one side of the clamping protrusion 211 in contact with the second plane, or between the clamping protrusion 211 and the notch portion 212, or on the clamping piece. When it is disposed on the clamping piece, the limiting rib 2111 extends in a direction away from the clamping piece from the second plane of the clamping piece. An abutting contact of the limiting rib 2111 and the clamping protrusion 211 limits a relative movement of the clamping piece and the clamping protrusion 211 in a circumferential direction, thereby ensuring a correct occlusion of the clamping piece and the clamping protrusion 211 to ensure a normal mounting of the water outlet valve 3.

It is to be noted that the above clamping piece does not have to be a piece-like structure, and the annular plate does not have to be a plate-like structure, as long as the clamping protrusion 211 is limited between the first plane and the second plane in the axial direction of the cylindrical structure 132. In addition, the first plane and the second plane are provided to ensure that the clamping protrusion 211 is better limited in the clamping slot 131, and the clamping protrusion 211 is in plane abutting or a plurality of contact abutting or other abutting contact with a slot side wall of the clamping slot 131, as long as it is ensured that the clamping protrusion 211 is limited in the clamping slot 131.

Referring to FIG. 1 to FIG. 2, in some embodiments, the rotating operation portion 11 includes an operation handle portion 111 disposed on the body 13, the body 13 includes an annular main body, and the operation handle portion 111 extends from a radial outer edge of the annular main body to a radial outer side of the annular main body. When rotating the rotating operation portion 11, it is more convenient for the operator to exert force, improve assembly efficiency, and save assembly time. In addition, the water tank is provided with a first limiting structure 22, the rotating connection member 1 is provided with a second limiting structure 14, and a rotation direction of the first cooperation portion 12 relative to the second cooperation portion 21 is limited by the cooperation of the first limiting structure 22 and the second limiting structure 14, to further facilitate the mounting of the rotating connection member 1 and effectively prevent the rotating connection member 1 from falling off the water tank body 2, the first limiting structure 22 includes a first limiting surface, and the second limiting structure 14 includes a second limiting surface. An abutting contact between the first limiting surface and the second limiting surface limits a reverse rotation of the rotating connection member 1 relative to the water tank body 2, so as to prevent the rotating connection member 1 from falling off the water tank body 2. In some embodiments, it is to be noted that the second limiting structure 14 is disposed on an operation handle portion 111, or is disposed on an annular main body, or disposed in other positions of the rotating connection member 1, and the first limiting structure 22 is disposed at a corresponding position on the water tank body 2 to better match the second limiting structure 14.

Referring to FIG. 1 to FIG. 2, in some embodiments, the mounting structure further includes a sealing structure (not shown), configured to seal the connection between the rotating connection member 1 and the water tank body 2 to avoid leakage of water. In an assembly state, the sealing structure is located between the first plane and the clamping protrusion 211. The sealing structure is an elastic sealing washer or a sealant. In some embodiments, the sealing structure is a rubber gasket, to be in a better press fit with the first radial structure 1311 in the shape of an annular plate, thereby achieving a better sealing effect and ensuring a normal use of the lower water outlet tank.

Referring to FIG. 1 to FIG. 3, in the above mounting structure, the water outlet valve 3 is mounted on the water tank body 2 by the rotating connection member 1, and a threaded connection known to inventors between the water tank nut and the water tank body 2 is replaced by the rotating occlusion connection between the rotating connection member 1 and the water tank body 2, the assembly mode is innovated, an assemblability is enhanced, and cost of molds, materials and labor are saved. It is perfectly assembled by rotation, which not only saves costs, but also is convenient and fast.

Those skilled in the art easily understand that the above solutions can be freely combined and superimposed on the premise of no conflict.

It should be understood that the above implementation manners are only exemplary, and not limiting, without departing from the basic principles of the disclosure. Those skilled in the art can make various obvious or equivalent modifications or replacements for the above details, which will be included within the scope of the claims of the disclosure.

What is claimed is:

1. A mounting structure for mounting a water outlet valve to a water tank body of a lower water outlet tank, wherein, the mounting structure comprises a rotating connection member on which the water outlet valve is disposed, and the rotating connection member comprises a rotating operation portion and a first cooperation portion connected with each other, wherein the mounting structure further comprises a second cooperation portion disposed on the water tank body, the rotating operation portion is rotated by a predetermined angle, such that the first cooperation portion and the second cooperation portion is converted between a first state of separation and a second state of mutual occlusion; the rotating connection member comprises a body, the first cooperation portion comprises a clamping slot provided on the body of the rotating connection member and extending along a circumferential direction of the rotating connection member, the second cooperation portion comprises a clamping protrusion that is inserted into the clamping slot, and the clamping protrusion extends from an outside to an inside in a radial direction of the rotating connection member; or, the first cooperation portion comprises a clamping protrusion provided on the body of the rotating connection member and extending along a circumferential direction of the rotating connection member, the clamping protrusion extends from an inside to an outside in a radial direction of the rotating connection member, and the second cooperation portion comprises a clamping slot that is cooperated with the clamping protrusion.

2. The mounting structure according to claim 1, wherein the clamping slot is provided on the rotating connection member, the rotating connection member comprises a cylindrical structure extending along an axial direction, an outer side wall of the cylindrical structure forms a slot bottom of the clamping slot, a first radial structure and a second radial structure extending along a radical direction of the rotating connection member are disposed on the cylindrical structure, the first radial structure is close to the rotating operation portion, the second radial structure is away from the rotating operation portion, the first radial structure comprises a first plane facing the second radial structure, the second radial structure comprises a second plane facing the first radial structure, and the first plane and the second plane form a slot side wall of the clamping slot.

3. The mounting structure according to claim 2, wherein the first radial structure is in a shape of an annular plate, and the second radial structure comprises a plurality of clamping pieces, and the plurality of clamping pieces are evenly arranged in a circumferential direction of the cylindrical structure; or the first radial structure is in a shape of an annular plate; or the second radial structure comprises a plurality of clamping pieces, and the plurality of clamping pieces are evenly arranged in a circumferential direction of the cylindrical structure.

4. The mounting structure according to claim 3, wherein the second cooperation portion comprises a plurality of clamping protrusions arranged at intervals in a circumferential direction, a space between two adjacent clamping protrusions forms a notch portion, there is a one-to-one correspondence between the plurality of clamping protrusions and the plurality of clamping pieces, there is a one-to-one correspondence between a plurality of notch portions and the plurality of clamping pieces; in the first state, each of the plurality of clamping pieces is located at a corresponding notch portion in the circumferential direction, and in the second state, each of the plurality of clamping pieces rotates to a corresponding clamping protrusion.

5. The mounting structure according to claim 4, wherein the mounting structure further comprises a plurality of limiting ribs, the plurality of limiting ribs are provided on the plurality of clamping protrusions in one-to-one correspondence, each of the plurality of limiting ribs is used to limit a movement of a corresponding clamping piece relative to the corresponding clamping protrusion, and each of the plurality of limiting ribs extends from a side of the corresponding clamping protrusion close to the second plane to a direction away from the corresponding clamping protrusion.

6. The mounting structure according to claim 2, comprising a sealing structure, located between the first plane and the clamping protrusion in an assembly state.

7. The mounting structure according to claim 1, wherein the mounting structure further comprises a first limiting structure provided on the water tank and a second limiting structure provided on the rotating connection member, and a rotation direction of the first cooperation portion relative to the second cooperation portion is limited by the cooperation of the first limiting structure and the second limiting structure.

8. The mounting structure according to claim 1, wherein the rotating operation portion comprises an operation handle portion disposed on the body of the rotating connection member, the body of the rotating connection member comprises an annular main body, and the operation handle portion extends from a radial outer edge of the annular main body to a radial outer side of the annular main body.

9. A lower water outlet tank, comprising a water tank body and a water outlet valve, wherein the water outlet valve is mounted on the water tank body by the mounting structure according to claim 1.

10. The lower water outlet tank according to claim 9, wherein the clamping slot is provided on the rotating connection member, the rotating connection member comprises a cylindrical structure extending along an axial direction, an outer side wall of the cylindrical structure forms a slot bottom of the clamping slot, a first radial structure and a second radial structure extending along a radical direction of the rotating connection member are disposed on the cylindrical structure, the first radial structure is close to the rotating operation portion, the second radial structure is away from the rotating operation portion, the first radial structure comprises a first plane facing the second radial structure, the second radial structure comprises a second plane facing the first radial structure, and the first plane and the second plane form a slot side wall of the clamping slot.

11. The lower water outlet tank according to claim 10, wherein the first radial structure is in a shape of an annular plate, and the second radial structure comprises a plurality of clamping pieces, and the plurality of clamping pieces are evenly arranged in a circumferential direction of the cylindrical structure; or the first radial structure is in a shape of an annular plate; or the second radial structure comprises a plurality of clamping pieces, and the plurality of clamping pieces are evenly arranged in a circumferential direction of the cylindrical structure.

12. The lower water outlet tank according to claim 11, wherein the second cooperation portion comprises a plurality of clamping protrusions arranged at intervals in a circumferential direction, a space between two adjacent clamping protrusions forms a notch portion, there is a one-to-one correspondence between the plurality of clamping protrusions and the plurality of clamping pieces, there is a one-to-one correspondence between a plurality of notch portions and the plurality of clamping pieces; in the first state, each of the plurality of clamping pieces is located at a corresponding notch portion in the circumferential direction, and in the second state, each of the plurality of clamping pieces rotates to a corresponding clamping protrusion.

13. The lower water outlet tank according to claim 12, wherein the mounting structure further comprises a plurality of limiting ribs, the plurality of limiting ribs are provided on the plurality of clamping protrusions in one-to-one correspondence, each of the plurality of limiting ribs is used to limit a movement of a corresponding clamping piece relative to the corresponding clamping protrusion, and each of the plurality of limiting ribs extends from a side of the corresponding clamping protrusion close to the second plane to a direction away from the corresponding clamping protrusion.

14. The lower water outlet tank according to claim 10, the mounting structure comprises a sealing structure, located between the first plane and the clamping protrusion in an assembly state.

15. The lower water outlet tank according to claim 9, wherein the mounting structure further comprises a first limiting structure provided on the water tank and a second limiting structure provided on the rotating connection member, and a rotation direction of the first cooperation portion relative to the second cooperation portion is limited by the cooperation of the first limiting structure and the second limiting structure.

16. The lower water outlet tank according to claim 9, wherein the rotating operation portion comprises an operation handle portion disposed on the body of the rotating connection member, the body of the rotating connection member comprises an annular main body, and the operation handle portion extends from a radial outer edge of the annular main body to a radial outer side of the annular main body.

* * * * *